(12) United States Patent
Kamepalli et al.

(10) Patent No.: US 11,340,854 B2
(45) Date of Patent: May 24, 2022

(54) SYSTEMS AND METHODS TO SYNCHRONIZE DISPLAY SETTINGS AMONG MULTIPLE DISPLAY DEVICES

(71) Applicant: Dell Products L.P., Round Rock, TX (US)

(72) Inventors: Srinivas Kamepalli, Austin, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 298 days.

(21) Appl. No.: 16/825,481

(22) Filed: Mar. 20, 2020

(65) Prior Publication Data

US 2021/0294556 A1 Sep. 23, 2021

(51) Int. Cl.
| | | |
|---|---|---|
| *G06F 3/14* | (2006.01) | |
| *G06F 9/54* | (2006.01) | |
| *G06F 13/42* | (2006.01) | |
| *G06F 1/26* | (2006.01) | |

(52) U.S. Cl.
CPC ............ *G06F 3/1423* (2013.01); *G06F 1/266* (2013.01); *G06F 9/543* (2013.01); *G06F 9/546* (2013.01); *G06F 13/4282* (2013.01); *G06F 2213/0042* (2013.01)

(58) Field of Classification Search
CPC ...... G06F 3/1423; G06F 3/0486; G06F 1/266; G06F 9/543; G06F 9/546; G06F 13/4282; G06F 2213/0042
See application file for complete search history.

(56) References Cited

U.S. PATENT DOCUMENTS

| | | | | |
|---|---|---|---|---|
| 2004/0243940 A1* | 12/2004 | Lee | .................... | G06F 3/04897 715/744 |
| 2009/0040135 A1* | 2/2009 | Piazza | .................. | G06F 3/1454 345/2.1 |
| 2013/0147776 A1* | 6/2013 | Lazzaro | .................. | G09G 5/00 345/207 |

* cited by examiner

*Primary Examiner* — Abbas I Abdulselam
(74) *Attorney, Agent, or Firm* — Jackson Walker L.L.P.

(57) ABSTRACT

A display device may include a communications interface and a controller configured to monitor for user-initiated changes to display settings associated with the display device and communicate a message via the communications interface to an information handling system in order to cause the information handling system to communicate a second message to a second display device to change display settings of the second display device responsive to the user-initiated changes to the display settings associated with the display device. The controller may also be configured to monitor for an indication from the information handling system via the communications interface indicative of user-initiated changes to display settings associated with the second display device and responsive to receipt of the indication from the information handling system indicative of user-initiated changes to display settings associated with the second display device, cause a change to display settings associated with the display device.

16 Claims, 3 Drawing Sheets

SYSTEMS AND METHODS TO SYNCHRONIZE DISPLAY SETTINGS AMONG MULTIPLE DISPLAY DEVICES

TECHNICAL FIELD

The present disclosure relates in general to information handling systems, and more particularly to methods and systems for synchronizing display settings among two or more display devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some environments, multiple display devices may be communicatively coupled to a single information handling system. In such an environment, in traditional implementations, user settings (e.g., brightness, contrast, tint, etc.) on each of the multiple display devices may be maintained separately from each other. Accordingly, using traditional approaches, when a user changes display settings on one display device coupled to an information handling system, the user must manually adjust other displays coupled to the information handling system in order to ensure consistent settings are maintained on the various displays.

SUMMARY

In accordance with the teachings of the present disclosure, the disadvantages and problems associated with maintaining consistent display settings among multiple display devices may be reduced or eliminated.

In accordance with embodiments of the present disclosure, a display device may include a communications interface and a controller configured to monitor for user-initiated changes to display settings associated with the display device and communicate a message via the communications interface to an information handling system in order to cause the information handling system to communicate a second message to a second display device to change display settings of the second display device responsive to the user-initiated changes to the display settings associated with the display device. The controller may also be configured to monitor for an indication from the information handling system via the communications interface indicative of user-initiated changes to display settings associated with the second display device and responsive to receipt of the indication from the information handling system indicative of user-initiated changes to display settings associated with the second display device, cause a change to display settings associated with the display device.

In accordance with these and other embodiments of the present disclosure, an information handling system may include a communications interface and a controller configured to monitor for an indication from a first display device via the communications interface indicative of user-initiated changes to display settings associated with the first display device and responsive to receipt of the indication from the first display device indicative of user-initiated changes to display settings associated with the first display device, communicate a message to a second display device via the communications interface to cause the second display device to change display settings of the second display device responsive to the user-initiated changes to the display settings associated with the display device.

In accordance with these and other embodiments of the present disclosure, a method may include monitoring for an indication from a first display device via a communications interface indicative of user-initiated changes to display settings associated with the first display device and responsive to receipt of the indication from the first display device indicative of user-initiated changes to display settings associated with the first display device, communicating a message to a second display device via the communications interface to cause the second display device to change display settings of the second display device responsive to the user-initiated changes to the display settings associated with the display device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
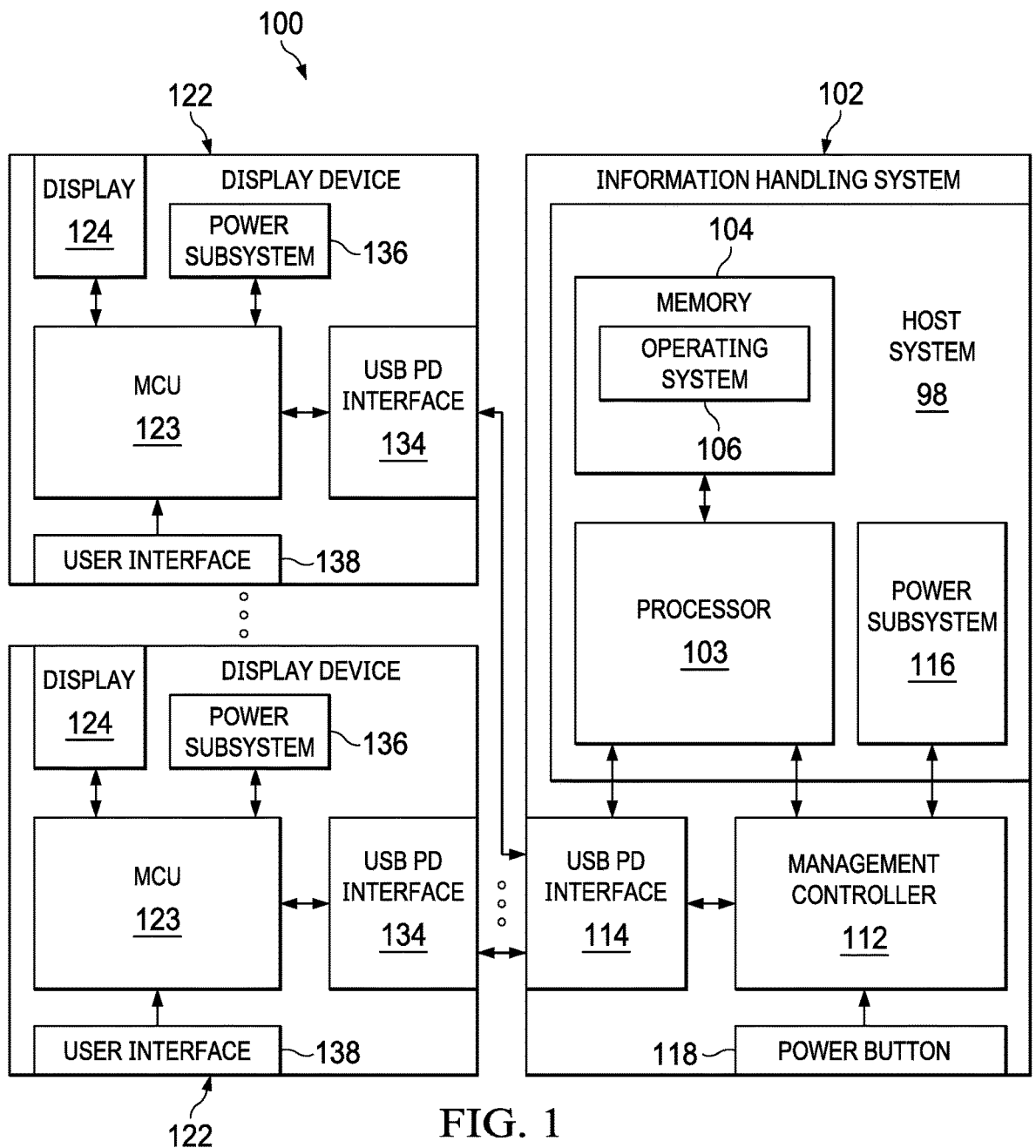
FIG. 1 illustrates a block diagram of an example system comprising an information handling system and a display device, in accordance with embodiments of the present disclosure.
Figure 2:
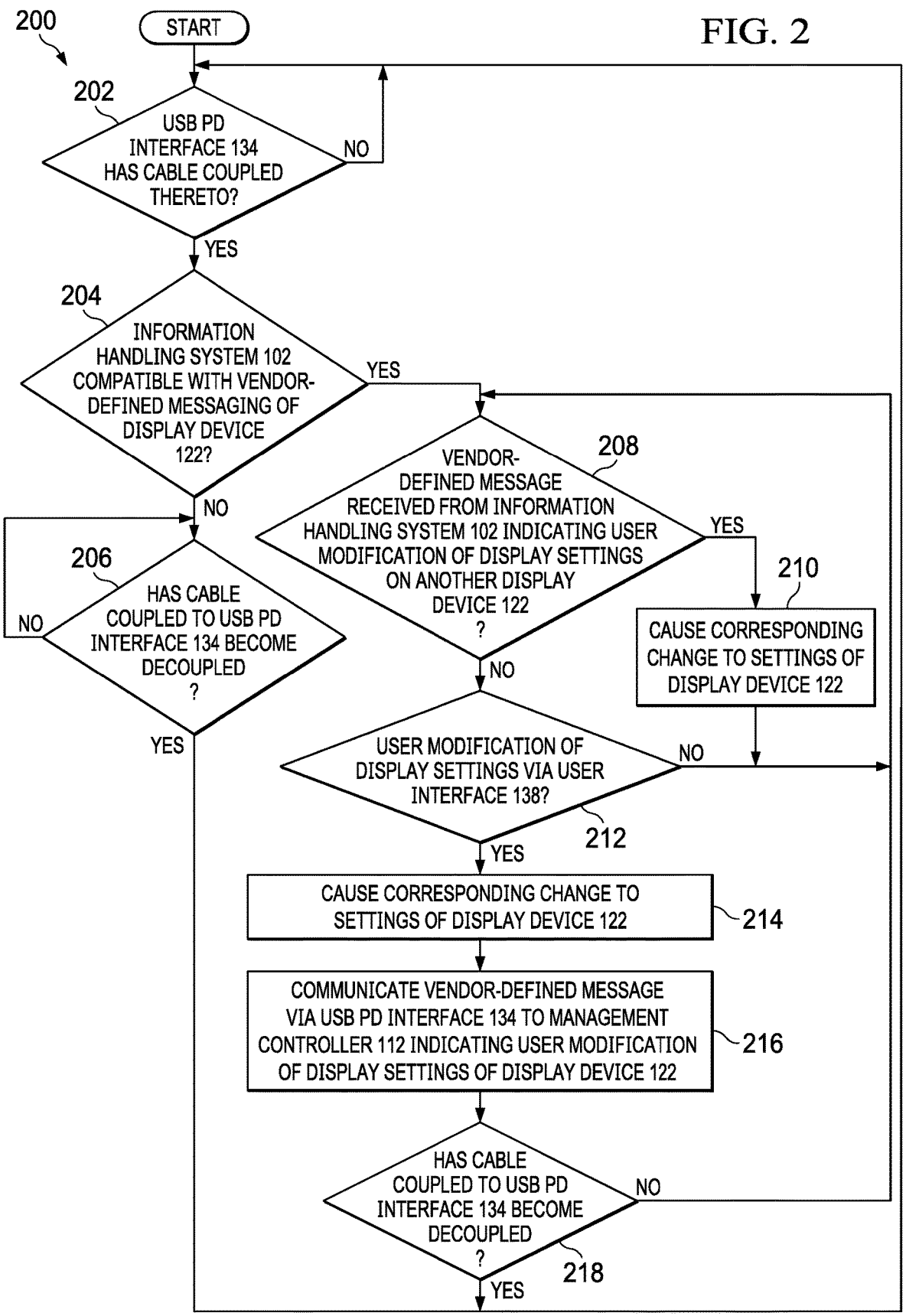
FIG. 2 illustrates a flow chart of an example method performed at a display device for synchronization of display settings among multiple display devices, in accordance with embodiments of the present disclosure.
Figure 3:
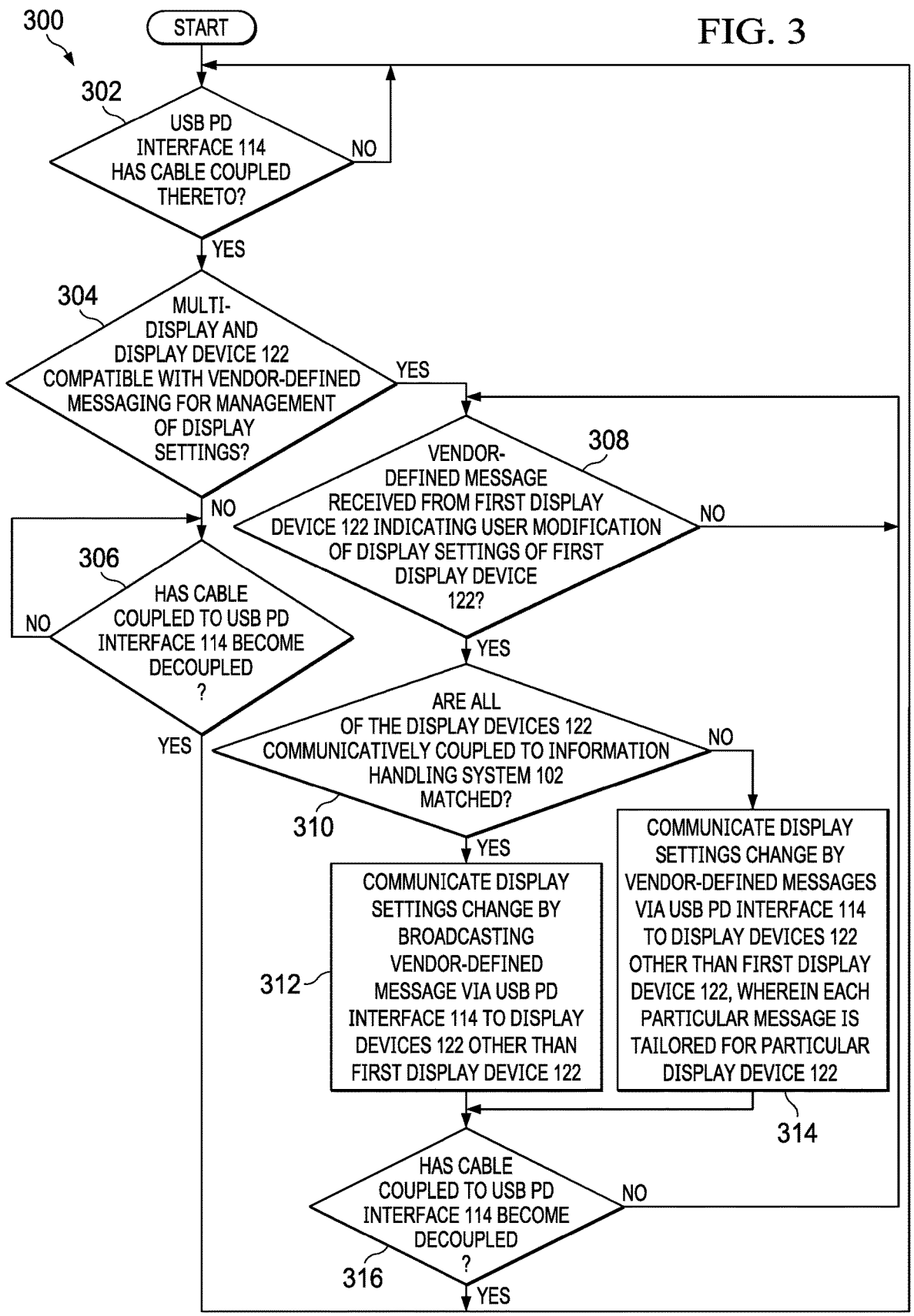
FIG. 3 illustrates a flow chart of an example method performed at an information handling system for synchronization of display settings among multiple display devices, in accordance with embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 comprising an information handling system 102 and a plurality of display devices 122, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a management controller 112 communicatively coupled to processor 103, a Universal Serial Bus (USB) Power Delivery (PD) interface 114 communicatively coupled to processor 103 and management controller 112, a power subsystem 116 communicatively coupled to management controller 112, and a power button 118 communicatively coupled to management controller 112. In operation, processor 103 and memory 104 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Management controller 112 may be configured to provide management facilities for management of information handling system 102. Such management may be made by management controller 112 even if information handling system 102 is powered off or powered to a standby state. Management controller 112 may include a processor, a memory, and or other components, such as USB PD interface 114. In certain embodiments, management controller 112 may include or may be an integral part of an embedded controller (EC), baseboard management controller (BMC), or a remote access controller (e.g., a Dell Remote Access Controller or Integrated Dell Remote Access Controller).

USB PD interface 114 may comprise any suitable system, device, or apparatus configured to serve as a cable interface in accordance with the USB PD specification. Although FIG. 1 depicts a USB PD interface 114, in some embodiments, an analogous data communication interface in accordance with a different communication standard may be used. In these and other embodiments, USB PD interface 114 may be communicatively coupled to management controller 112 via an Inter-Integrated Circuit (I2C) communications bus.

Power subsystem 116 may comprise any suitable system, device, or apparatus configured to deliver electrical energy to one or more components of information handling system 102 in order to allow such components to function. Accordingly, power subsystem 116 may include any suitable combination and numbers of power supply units, energy storage devices (e.g., batteries), regulators, and electrical conduits (e.g., wires, traces).

Power button 118 may comprise any suitable system, device, or apparatus with which a user may interact to indicate a desire to power on or power off information handling system 102. Accordingly, power button 118 may comprise an electromechanical button, a virtual mechanical button, or any other suitable device.

In addition to processor 103, memory 104, and management controller 112, USB PD interface 114, power subsystem 116, and power button 118, information handling system 102 may include one or more other information handling resources. In addition, although FIG. 1 shows information handling system 102 configured as what many would consider a computing system, in some embodiments, information handling system 102 may include fewer components than that often seen in a computing system, and may comprise a device with less functionality, such as a docking station or port replicator.

As depicted in FIG. 1, a display device 122 may include a microcontroller unit (MCU) 123, a display 124 communicatively coupled to MCU 123, a USB PD interface 134 communicatively coupled to MCU 123, a power subsystem 136 communicatively coupled to MCU 123, and a user interface 138 communicatively coupled to MCU 123.

MCU 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data.

Display 124 may include any system, device, or apparatus configured to generate graphical images and/or reproduce alphanumeric text for viewing by a user of information handling system 102, based on display data communicated to display 124 from information handling system 102. Display 124 may comprise a light-emitting diode display, liquid crystal display, and/or any other suitable display.

USB PD interface 134 may comprise any suitable system, device, or apparatus configured to serve as a cable interface in accordance with the USB PD specification. Although FIG. 1 depicts a USB PD interface 134, in some embodiments, an analogous data communication interface in accordance with a different communication standard may be used. In operation, USB PD interface 134 may be coupled to USB PD interface 114 by a suitable cable (e.g., a USB Type-C cable).

Power subsystem 136 may comprise any suitable system, device, or apparatus configured to deliver electrical energy to one or more components of display device 122 in order to allow such components to function. Accordingly, power subsystem 136 may include any suitable combination and number of power supply units, energy storage devices (e.g., batteries), regulators, and electrical conduits (e.g., wires, traces).

User interface 138 may comprise any suitable system, device, or apparatus with which a user may interact with a display device 122 to indicate a desire to modify a power state (e.g., power on or off), setting (e.g., brightness, contrast, tint, aspect ratio, etc.), and/or other characteristic of display device. Accordingly, user interface 138 may comprise one or more electromechanical buttons, one or more virtual mechanical buttons, a graphical menu that overlays on display 124 in response to interaction with physical and/or virtual buttons, and/or any other suitable device or collection of devices.

For clarity of exposition, FIG. 1 depicts two display devices 122 communicatively coupled to information handling system 102. However, in some embodiments of system 100, system 100 may include three or more display devices 122 communicatively coupled to information handling system 102 (e.g., directly to information handling system 102 or in a daisy chain from display device 122 to display device 122).

As described in greater detail below, USB PD interface 114 and USB PD interfaces 134 may utilize a vendor-defined messaging (VDM) capability of USB-C/Type-C, along with functionality of an MCU 123 to communicate via configuration channel (CC) pins of a USB PD connection between a display device 122 associated with the MCU 123 and information handling system 102. Accordingly, as described in greater detail below, in concert with information handling system 102, multiple display devices 122 may be configured to synchronize display settings among themselves in response to a user modifying settings on one of the multiple display devices 122.

FIG. 2 illustrates a flow chart of an example method 200 performed at a display device for synchronization of display settings among multiple display devices, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, MCU 123 of a first display device 122 may determine whether USB PD interface 134 has a cable coupled thereto. If no cable is detected, method 200 may remain at step 202. Otherwise, if a cable is detected, method 200 may proceed to step 204.

At step 204, MCU 123 may query information handling system 102, by querying management controller 112 via USB PD interface 134 (e.g., via CC pins), to determine if information handling system 102 is compatible with an ability of display device 122 to communicate vendor-defined messages for management of display settings. If information handling system 102 is not compatible with an ability of display device 122 to communicate vendor-defined messages for management of display settings, method 200 may proceed to step 206. Otherwise, if information handling system 102 is compatible with an ability of display device 122 to communicate vendor-defined messages for management of display settings, method 200 may proceed to step 208.

At step 206, MCU 123 may determine whether a cable coupled to USB PD interface 134 has become decoupled therefrom. If the cable coupled to USB PD interface 134 remains coupled thereto, method 200 may remain at step 206 until the cable coupled to USB PD interface 134 has become decoupled therefrom. Otherwise, if a cable coupled to USB PD interface 134 has become decoupled therefrom, method 200 may proceed again to step 202.

At step 208, MCU 123 may determine if a vendor-defined message has been received from information handling system 102 indicating user modification of display settings on another display device 122 other than the first display device 122. If such a vendor-defined message has been received, method 200 may proceed to step 210. If such a vendor-defined message has not been received, method 200 may proceed to step 212.

At step 210, in response to receipt of a vendor-defined message from information handling system 102 indicating user modification of display settings on another display device 122, MCU 123 may cause a corresponding change to the first display device 122 as if its own user interface 138 had received user interaction to modify such display settings. After completion of step 210, method 200 may proceed again to step 208.

At step 212, MCU 123 may monitor for user modification of display settings occurring at the first display device 122 associated with MCU 123 (e.g., via user interface 138). If user modification of display settings occurs local to the first display device 122, method 200 may proceed to step 214. Otherwise, in the absence of such user modification, method 200 may proceed again to step 208, and steps 208 through 212 may repeat until MCU 123 receives a vendor-defined message from information handling system 102 indicating user modification of display settings on another display device 122 or detects user modification of display settings local to the first display device 122.

At step 214, MCU 123 may cause a change in display settings of display device 122 responsive to user interaction with user interface 138 to modify display settings. At step 216, also responsive to user interaction with user interface 138 to modify display settings, MCU 123 may communicate a vendor-defined message via USB PD interface 134 to management controller 112 indicating user modification of display settings at the display device 122.

At step 218, MCU 123 may determine whether a cable coupled to USB PD interface 134 has become decoupled therefrom. If the cable coupled to USB PD interface 134 remains coupled thereto, method 200 may proceed again to step 208. Otherwise, if a cable coupled to USB PD interface 134 has become decoupled therefrom, method 200 may proceed again to step 202.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented in whole or part using display device 122, MCU 123, and/or any other system operable to implement method 200. In certain embodiments, method 200 may be implemented partially or fully in software and/or firmware embodied in computer-readable media.

FIG. 3 illustrates a flow chart of an example method 300 performed at information handling system 102 for synchronization of display settings among multiple display devices, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 112 may determine whether USB PD interface 114 has a cable coupled thereto. If no cable is detected, method 300 may remain at step 302. Otherwise, if a cable is detected, method 300 may proceed to step 304.

At step 304, management controller 112 may query display device 122, by querying MCU 123 via USB PD interface 114 (e.g., via CC pins), to determine if a display device 122 communicatively coupled to information handling system 102 is compatible with an ability of information handling system 102 to communicate vendor-defined messages for management of display settings. If display device 122 is not compatible with an ability of information handling system 102 to communicate vendor-defined messages for management of display settings, method 300 may proceed to step 306. Otherwise, if display device 122 is compatible with an ability of information handling system 102 to communicate vendor-defined messages for management of display settings, method 300 may proceed to step 308.

At step 306, management controller 112 may determine whether a cable coupled to USB PD interface 114 has become decoupled therefrom. If the cable coupled to USB PD interface 114 remains coupled thereto, method 300 may remain at step 306 until the cable coupled to USB PD interface 114 has become decoupled therefrom. Otherwise, if a cable coupled to USB PD interface 114 has become decoupled therefrom, method 300 may proceed again to step 302.

At step 308, management controller 112 may determine if a vendor-defined message has been received from a first display device 122 indicating a user modification of display settings of the first display device 122. If such a vendor-defined message has been received, method 300 may proceed to step 310. If such a vendor-defined message has not been received, method 300 may proceed to step 312.

At step 310, in response to receipt of a vendor-defined message from a display device 122 indicating a user modification of display settings of the first display device 122, management controller 112 may determine whether all of the display devices 122 communicatively coupled to information handling system 102 are matched display devices (e.g., by the same manufacturer or similar enough in control that receipt of the same message by the matched displays will have the same desired effect at the matched displays). If all of the display devices 122 communicatively coupled to information handling system 102 are matched display devices, method 300 may proceed to step 312. Otherwise, method 300 may proceed to step 314.

At step 312, responsive to all of the display devices 122 communicatively coupled to information handling system 102 being matched display devices, management controller 112 may communicate the display settings change by broadcasting a vendor-defined message via USB PD interface 114 to MCUs 123 of one or more display devices 122 other than the first display device 122 indicating a user modification of display settings of the first display device 122. After completion of step 312, method 300 may proceed to step 316.

At step 314, responsive to less than all of the display devices 122 communicatively coupled to information handling system 102 being matched display devices, management controller 112 may communicate the display settings change by issuing multiple vendor-defined messages via USB PD interface 114 to MCUs 123 of one or more display devices 122 other than the first display device 122 indicating a user modification of display settings of the first display device 122, wherein each particular message of the multiple vendor-defined messages may be individually tailored for the particular display device 122 for which the particular message is intended.

At step 316, management controller 112 may determine whether a cable coupled to USB PD interface 114 has become decoupled therefrom. If the cable coupled to USB PD interface 114 remains coupled thereto, method 300 may proceed again to step 308. Otherwise, if a cable coupled to USB PD interface 114 has become decoupled therefrom, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented in whole or part using information handling system 102, management controller 112, and/or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A display device comprising:
    a communications interface; and
    a controller configured to:
        monitor for user-initiated changes to display settings associated with the display device and communicate a message via the communications interface to an information handling system in order to cause the information handling system to communicate a second message to a second display device to change display settings of the second display device responsive to the user-initiated changes to the display settings associated with the display device; and
        monitor for an indication from the information handling system via the communications interface indicative of user-initiated changes to display settings associated with the second display device and responsive to receipt of the indication from the information handling system indicative of user-initiated changes to display settings associated with the second display device, cause a change to display settings associated with the display device.

2. The display device of claim 1, wherein the display device is coupled to the communications interface of the information handling system via a cable.

3. The display device of claim 1, wherein the communications interface is compatible with Universal Serial Bus Power Delivery standard.

4. A method comprising:
    monitoring for user-initiated changes to display settings associated with a first display device and communicating a message via a communications interface to an information handling system in order to cause the information handling system to communicate a second message to a second display device to change display settings of the second display device responsive to the user-initiated changes to the display settings associated with the first display device; and
    monitoring for an indication from the information handling system via the communications interface indicative of user-initiated changes to display settings associated with the second display device and responsive to receipt of the indication from the information handling system indicative of user-initiated changes to display settings associated with the second display device, causing a change to display settings associated with the first display device.

5. The method of claim 4, wherein the display device is coupled to the communications interface of the information handling system via a cable.

6. The method of claim 4, wherein the communications interface is compatible with Universal Serial Bus Power Delivery standard.

7. An information handling system comprising:
    a communications interface; and
    a controller configured to:
        monitor for an indication from a first display device via the communications interface indicative of user-initiated changes to display settings associated with the first display device; and responsive to receipt of the indication from the first display device indicative of user-initiated changes to display settings associated with the first display device, communicate a message to a second display device via the communications interface to cause the second display device to change display settings of the second display device responsive to the user-initiated changes to the display settings associated with the display device.

8. The system of claim 7, wherein the display device is coupled to the communications interface of the information handling system via a cable.

9. The system of claim 7, wherein the communications interface is compatible with Universal Serial Bus Power Delivery standard.

10. The system of claim 7, wherein the controller is further configured to, responsive to receipt of the indication from the first display device indicative of user-initiated changes to display settings associated with the first display device, communicate the message to a third display device to cause the third display device to change display settings of the third display device responsive to the user-initiated changes to the display settings associated with the display device, wherein the message is broadcast by the controller to the second display device and the third display device.

11. The system of claim 7, wherein the controller is further configured to, responsive to receipt of the indication from the first display device indicative of user-initiated changes to display settings associated with the first display device, communicate a second message to a third display device to cause the third display device to change display settings of the third display device responsive to the user-initiated changes to the display settings associated with the display device, wherein the second message is adapted by the controller to the second display device and the third message is adapted by the controller to the third display device.

12. A method comprising:
monitoring for an indication from a first display device via a communications interface indicative of user-initiated changes to display settings associated with the first display device; and responsive to receipt of the indication from the first display device indicative of user-initiated changes to display settings associated with the first display device, communicating a message to a second display device via the communications interface to cause the second display device to change display settings of the second display device responsive to the user-initiated changes to the display settings associated with the display device.

13. The method of claim 12, wherein the display device is coupled to the communications interface of the information handling system via a cable.

14. The method of claim 12, wherein the communications interface is compatible with Universal Serial Bus Power Delivery standard.

15. The method of claim 12, further comprising, responsive to receipt of the indication from the first display device indicative of user-initiated changes to display settings associated with the first display device, communicating the message to a third display device to cause the third display device to change display settings of the third display device responsive to the user-initiated changes to the display settings associated with the display device, wherein the message is broadcast to the second display device and the third display device.

16. The method of claim 12, further comprising, responsive to receipt of the indication from the first display device indicative of user-initiated changes to display settings associated with the first display device, communicating a second message to a third display device to cause the third display device to change display settings of the third display device responsive to the user-initiated changes to the display settings associated with the display device, wherein the second message is adapted to the second display device and the third message is adapted to the third display device.

* * * * *